(12) United States Patent
Xu et al.

(10) Patent No.: US 12,210,529 B2
(45) Date of Patent: Jan. 28, 2025

(54) MIRROR LIST QUERY METHOD OF MULTI-ARCHITECTURE CLOUD PLATFORM MIRROR WAREHOUSE

(71) Applicant: INSPUR SUZHOU INTELLIGENT TECHNOLOGY CO., LTD., Jiangsu (CN)

(72) Inventors: Yuchao Xu, Jiangsu (CN); Zhengwei Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 67 days.

(21) Appl. No.: 18/164,711

(22) Filed: Feb. 6, 2023

(65) Prior Publication Data
US 2023/0289351 A1  Sep. 14, 2023

Related U.S. Application Data

(63) Continuation of application No. PCT/CN2021/096400, filed on May 27, 2021.

(30) Foreign Application Priority Data

Aug. 6, 2020 (CN) .......................... 202010786150.5

(51) Int. Cl.
*G06F 16/2455* (2019.01)
*G06F 9/455* (2018.01)
(Continued)

(52) U.S. Cl.
CPC ........ *G06F 16/2456* (2019.01); *G06F 16/254* (2019.01)

(58) Field of Classification Search
CPC .............. G06F 16/2456; G06F 16/254; G06F 16/2455; G06F 9/45558; G06F 16/22; G06F 2009/45562
See application file for complete search history.

(56) References Cited

U.S. PATENT DOCUMENTS

| 8,688,643 | B1* | 4/2014 | Deopujari | ............. | G06F 3/0635 |
| | | | | | 707/655 |
| 2013/0132942 | A1* | 5/2013 | Wang | .................. | G06F 9/45504 |
| | | | | | 717/176 |

(Continued)

FOREIGN PATENT DOCUMENTS

| CN | 109391664 A | 2/2019 |
| CN | 109582695 A | 4/2019 |

(Continued)

OTHER PUBLICATIONS

Search report for Chinese application No. 202010786150.5 filed on Aug. 6, 2020.

(Continued)

*Primary Examiner* — Robert W Beausoliel, Jr.
*Assistant Examiner* — Mohammad S Bhuyan
(74) *Attorney, Agent, or Firm* — Dennemeyer & Associates LLC

(57) ABSTRACT

A mirror list query method of a multi-architecture cloud platform mirror warehouse is provided. Two containers are added into a pod where a core component runs; a request shunting component and an expansion core component are respectively configured in the two containers, and a target port in service (svc) of the pod of the core component is specified as a port monitored by the request shunting component; the request shunting component receives requests from the port, transmits a mirror query request to the expansion core component, and transmits the requests except the mirror query request to the core component for processing; and the expansion core component reads mirror data in a database component, executes a query instruction in the query request, screens the mirror data, calls a registration component interface according to a screening result, and returns information of a mirror conforming to the screening result.

20 Claims, 3 Drawing Sheets

(51) Int. Cl.
*G06F 16/22* (2019.01)
*G06F 16/25* (2019.01)

(56) References Cited

U.S. PATENT DOCUMENTS

2016/0127465 A1* 5/2016 Barstow .................. G06F 16/27
                                                              707/620
2018/0278686 A1* 9/2018 Sprague .................... G06F 3/12
2019/0138410 A1   5/2019 Lowney et al.

FOREIGN PATENT DOCUMENTS

| CN | 109684420 A | 4/2019 |
| CN | 109831500 A | 5/2019 |
| CN | 110333877 A | 10/2019 |
| CN | 110647580 A | 1/2020 |
| CN | 111262908 A | 6/2020 |
| CN | 112000696 A | 11/2020 |

OTHER PUBLICATIONS

International Search report for PCT/CN2021/096400 mailed on Aug. 27, 2021.

* cited by examiner

| NO. | project_id | repo | tag | digest | kind | creation_time | pull_time | push_time |
|---|---|---|---|---|---|---|---|---|
| 6 | 1 | library/bes | 9.5.1-arm64 | sha256:d3e9e2d512c0afb | Docker-Image | 2020-06-16 07:55:26.0114 | (Null) | 2020-06-16 07:55:26.0114 |
| 7 | 1 | library/apusic | 9.0-arm64 | sha256:1c0e71990e83023 | Docker-Image | 2020-06-16 07:55:44.7097 | (Null) | 2020-06-16 07:55:44.7097 |

Fig. 3
| NO. | labelname | description | color | level | scope | project_id | creation_time | update_time | deleted |
|---|---|---|---|---|---|---|---|---|---|
| (Null) | (Null) | (Null) | (Null) | (Null) | (Null) | (Null) | (Null) | (Null) | (Null) |
Fig. 4
| NO. | name | project_id | description | pull_count | star_count | creation_time | update_time |
|---|---|---|---|---|---|---|---|
| 6 | library/bes | 1 | | 0 | 0 | 2020-06-16 07:55:25.9340 | 2020-06-16 07:55:25.9340 |
| 7 | library/apusic | 1 | | 0 | 0 | 2020-06-16 07:55:44.6203 | 2020-06-16 07:55:44.6203 |
Fig. 5
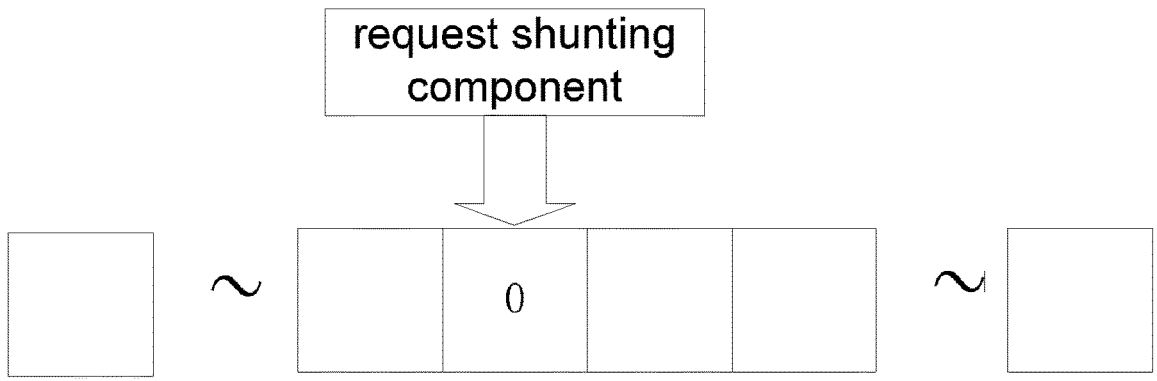
Fig. 6
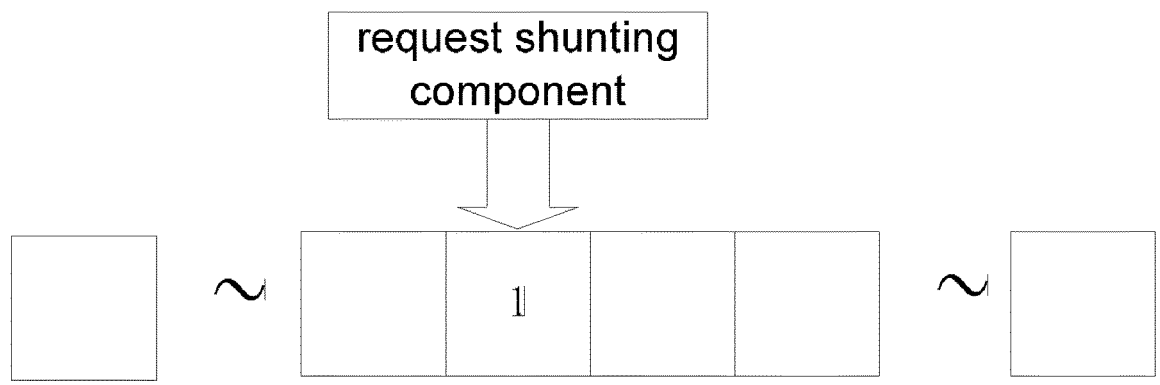

MIRROR LIST QUERY METHOD OF MULTI-ARCHITECTURE CLOUD PLATFORM MIRROR WAREHOUSE

CROSS-REFERENCE TO RELATED APPLICATION

This application claims priority to a Patent Application No. 202010786150.5, filed on Aug. 6, 2020 in China National Intellectual Property Administration and entitled "Mirror List Query method of Multi-Architecture Cloud Platform Mirror Warehouse", which is incorporated herein by reference in its entirety.

TECHNICAL FIELD

The present disclosure relates to the field of mirror query, in particular to a mirror list query method of a multi-architecture cloud platform mirror warehouse.

BACKGROUND

The present disclosure is mainly applied to a mirror list architecture of a domestic multi-architecture cloud platform mirror warehouse. A mirror list of a mirror warehouse realized by this method supports querying mirrors from a system architecture level and a mirror classification level, and supports querying mirrors of different architectures and types.

In the era of cloud computing, more and more companies and individuals use a container technology. There are more and more mirrors of different architectures and types. Searching and querying of mirrors become a heavy work. At present, the most commonly used mirror management tool is harbor which mainly classifies mirrors by projects and labels. Users can only query a certain mirror in a specified project during mirror querying, and query by labels can only be conducted in specified projects. It is impossible to query mirrors across projects, but a mirror architecture is often cross-project. As a result, it is not easy to implement classification and query at the system architecture level when harbor is used.

SUMMARY

The present disclosure provides a mirror list query method of a multi-architecture cloud platform mirror warehouse.

The present disclosure provides a mirror list query method of a multi-architecture cloud platform mirror warehouse. A harbor is deployed on a kubernetes; a queue component, a registration component, a core component, a database component, and a work service component of the harbor are deployed in different pods (the pod is a minimum unit created, called and managed by the kubernetes), including:

two containers are added into the pod where a core component runs; a request shunting component and an expansion core component are respectively configured in the two containers, and a target port in service (svc) of the pod of the core component is specified as a port monitored by the request shunting component;

a request from the monitored port is received by the request shunting component, it is determined by the request shunting component whether the request is a mirror query request, on the condition that the request is the mirror query request, the request is transmitted to the expansion core component by the request shunting component, and on the condition that the request is not the mirror query request, the request is transmitted to the core component by the request shunting component;

labels are added for mirrors by the core component;

mirror data in the database component is read by the expansion core component, the mirror data is screened by the expansion core component according to the mirror query request, the registration component is called by the expansion core component according to a screening result, and information of a mirror conforming to the screening result is returned by the expansion core component.

In some embodiments, a parity bit is configured in a request packet; and different values are configured to the parity bit according to whether the request packet is a mirror query data packet.

In some embodiments, the request shunting component receives the request packet, reads the values of the parity bit, and determines whether the request is the mirror query request.

In some embodiments, a first data table, a second data table and a third data table are configured in the database component; the first data table includes at least one field combined by a mirror version and an architecture label, and a project number; the second data table includes a custom label field and a project number; and the third data table includes a mirror name field and a project number.

In some embodiments, the expansion core component is joined with the first data table, the second data table and the third data table to acquire the mirror data.

In some embodiments, the labels are added for the mirrors by the core component, which includes:

a webhook is configured between the registration component and the expansion core component; when a mirror is added in the registration component, a mirror name and a mirror version are sent to the expansion core component by the webhook, and the expansion core component is called to acquire architecture information of the mirror by the webhook;

the architecture information is transmitted to the core component by the expansion core component; and an architecture label is generated by the core component according to the architecture information, and the architecture label is added to the mirror by the core component by means of executing a first instruction.

In some embodiments, the labels are added for the mirrors by the core component, which further includes: a custom label is created by means of a user interface (UI); the custom label is transmitted to the core component by the UI, or the core component is controlled to acquire the custom label that has been defined by the UI; and a second instruction is executed to add the custom label to the mirror by the core component.

In some embodiments, when the custom label is created, the core component calls data in the second data table, and compares the data with the custom label to determine whether the custom label has been existed in the second data table; on the condition that the custom label has been existed in the second data table, the core component reports, through the UI, that the label has been existed; and on the condition that the custom label has not been existed in the second data table, the core component adds the custom label to a table cell corresponding to the second data table after the custom label is added to the mirror.

In some embodiments, the core component adds, to the third data table, a mirror name submitted to the registration component and the project number corresponding to the mirror; after adding succeeds, the core component calls a corresponding interface according to other fields of the third data table except the mirror name and the project number, so as to acquire management content; and the core component adds the acquired management content to the third data table.

In some embodiments, the core component adds, to the first data table, a combination of the mirror version and the architecture label submitted to the registration component and the corresponding project number; after adding succeeds, the core component calls a corresponding interface according to other fields of the first data table except the mirror version and the architecture label as well as the project number, so as to acquire management content; and the core component adds the acquired management content to the third data table.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also may acquire other drawings according to structures shown in these accompanying drawings without doing creative work.

FIG. 3 is a schematic diagram of a second data table in an embodiment of the present disclosure;

FIG. 4 is a schematic diagram of a third data table in an embodiment of the present disclosure;

FIG. 5 is a schematic diagram illustrating that a shunting component reads a parity bit of a data packet of a mirror query request in an embodiment of the present disclosure;

FIG. 6 is a schematic diagram illustrating that a shunting component reads parity bits of data packets of other requests in an embodiment of the present disclosure.

The achievement of objectives, function characteristics, and advantages of the present disclosure will be further described in combination with embodiments and with reference to accompanying drawings.

DETAILED DESCRIPTION OF THE EMBODIMENTS

It should be understood that the specific embodiments described here are merely to explain the present disclosure, and not intended to limit the present disclosure.

Figures 1, 2:
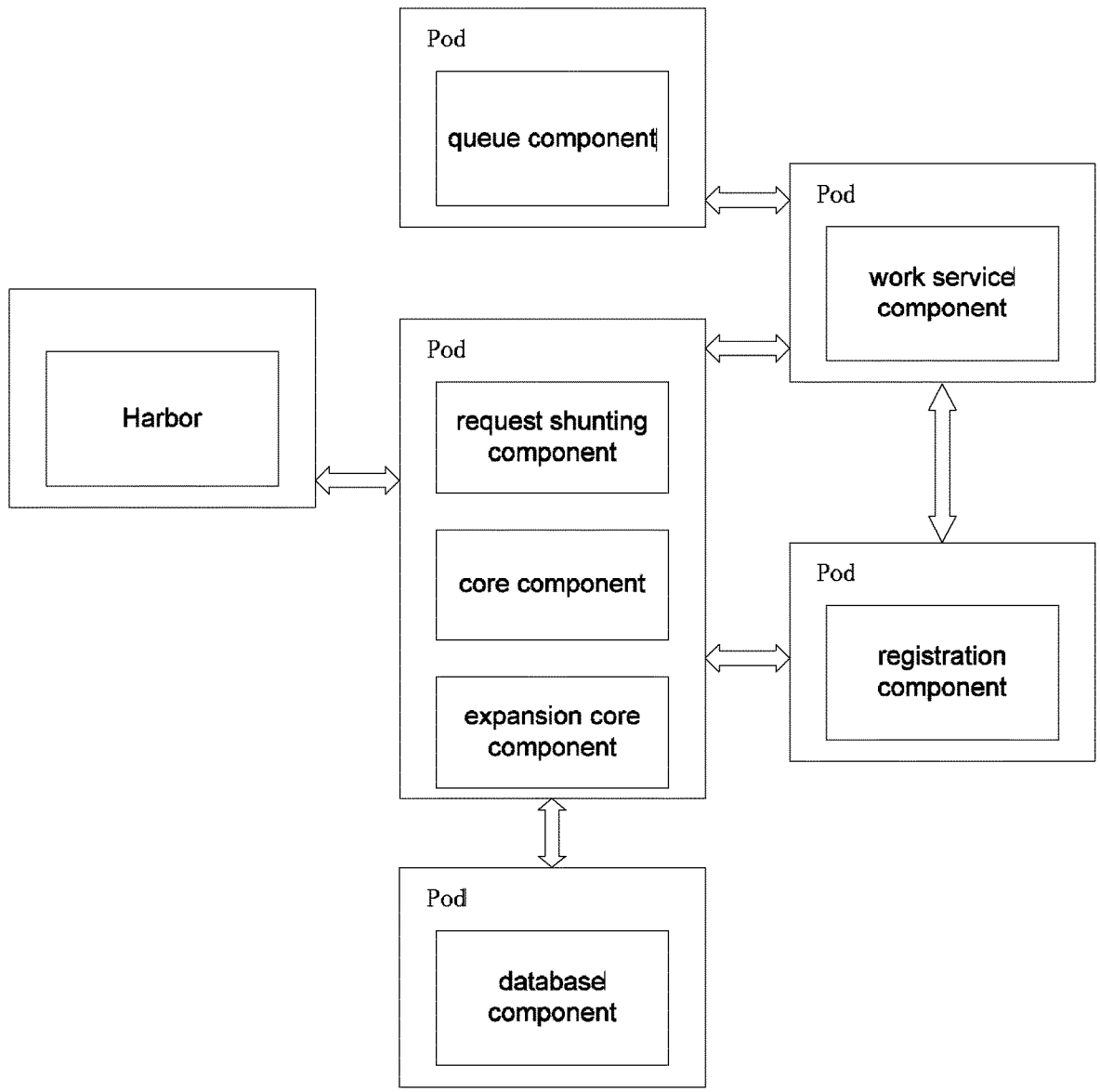
FIG. 1 is a schematic diagram of a mirror list query implementation architecture of a multi-architecture cloud platform mirror warehouse in an embodiment of the present disclosure.
FIG. 2 is a schematic diagram of a first data table in an embodiment of the present disclosure.
Figure 7:
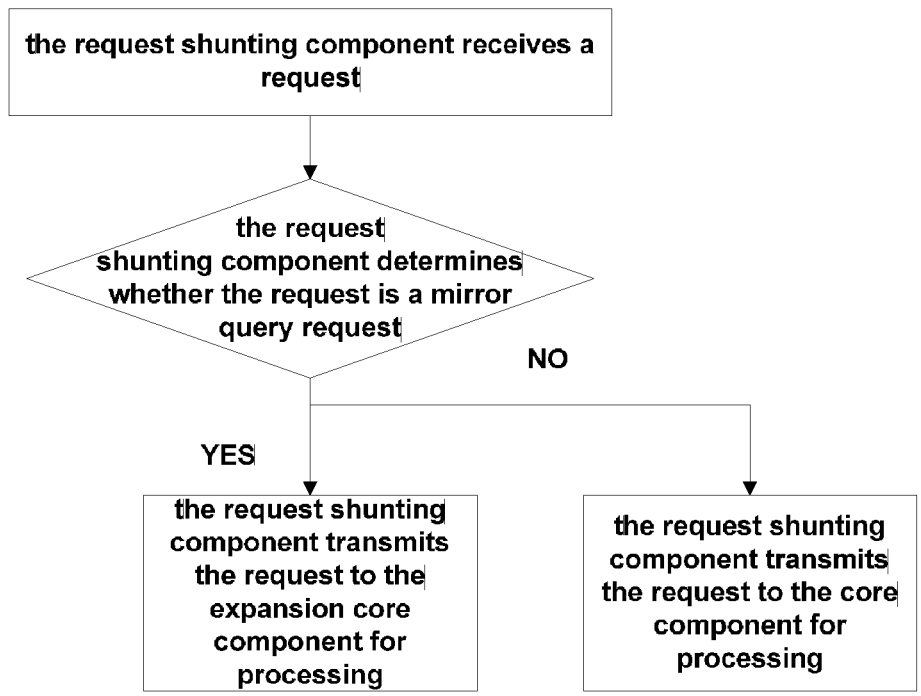
FIG. 7 is a schematic diagram of a shunting flow of a shunting component in an embodiment of the present disclosure.

Referring to FIG. 1, the present disclosure provides a mirror list query method of a multi-architecture cloud platform mirror warehouse. A harbor of version 1.10 or above is deployed on kubernetes; and a queue component, a registration component, a core component, a database component and a work service component of the harbor are deployed in different pods.

Two containers are added into the pod where the core component runs; a request shunting component and an expansion core component are respectively configured in the two containers, and a target port in svc of the pod of the core component is specified as a port monitored by the request shunting component.

The request shunting component receives a request from the monitored port. The request shunting component determines whether the request is a mirror query request, transmits, on the condition that the request is the mirror query request, the request to the expansion core component, and transmits, on the condition that the request is not the mirror query request, the request to the core component. In some embodiments, one idle bit of the request packet is configured to be a parity bit. If the request is the mirror query request, the parity bit is set to be 1, otherwise, the parity bit is set to be 0. The request shunting component receives the request packet and reads a value of the parity bit. If the value of the parity bit is 1, it is determined that the request is the mirror query request, and the request shunting component sends the mirror query request to the expansion core component. If the value of the parity bit is 0, the request shunting component determines that the request is not the mirror query request, and the request shunting component sends the request to the core component for processing.

The core component of the mirror list query method of the multi-architecture cloud platform mirror warehouse adds labels for mirrors, which facilitates configuring the mirror query request according to the labels.

In some embodiments, the core component adds the labels for the mirrors, which includes adding architecture labels and adding custom labels.

The architecture label is automatically added by the core component. In some embodiments, a webhook monitoring port is configured on the registration component, and a webhook terminal is configured on the expansion core component. When a mirror monitored by the webhook monitoring port is uploaded to the registration component, the webhook terminal calls the expansion core component and transmits, to the expansion core component, a mirror name and a mirror version uploaded to the registration component; the expansion core component called by the webhook terminal calls a registration component interface and sends the mirror name and the mirror version to the registration component interface. The registration component interface returns architecture information of the mirror according to the mirror name and the mirror version. In a specific implementation process, the registration component interface acquires mirror information through a docker inspect command. After the expansion core component receives the architecture information of the mirror, the expansion core component calls the core component and transmits the architecture information to the core component. The core component extracts keywords in the architecture information according to the architecture information to generate an architecture label, and adds the architecture label to the mirror by means of executing a first instruction. The first instruction is a tag mirror name: architecture label xxxx//project-test/mirror name: mirror version.

The custom label is manually added to the mirror. In some embodiments, when a custom label is newly formulated, a user creates the custom label by means of a UI according to a need. The UI transmits the custom label to the core component. Or the user controls, by means of the UI, the core component to acquire the custom label (stored in the second data table) that has been formulated. After the core component acquires the custom label, the core component executes a second instruction to add the custom label to the mirror. The second instruction is a tag mirror name: custom label xxxx/project-test/mirror name: mirror version.

In a specific implementation process, a retrieval interface, a custom label adding interface and an architecture label and custom label display column are configured in the UI. It is convenient for the user to formulate a mirror query policy according to the mirror label shown in the UI.

The query policy is formulated, and the mirror query request is generated. The mirror query request is transmitted by the request shunting component to the expansion core component for processing. The expansion core component acquires the request of the mirror query component and then acquires a query instruction in the data packet of the mirror query request. The expansion core component reads mirror data in the database component. In some embodiments, the mirror data includes data for configuring the first data table, the second data table and the third data table in the database component.

Referring to FIG. 2, fields in the first data table includes a serial number, project_id (project number), tag (combination of the mirror version and the architecture label), repo (mirror name), digest (compilation), kind (mirror kind), creation_time (mirror creation time), pull_time (mirror pull time) and push_time (mirror push time). In a specific implementation process, the core component adds, to the first data table, the mirror version and the mirror architecture submitted to the registration component and the corresponding project number. After the adding succeeds, the core component calls a corresponding interface according to other fields of the first data table except the combination of the mirror version and the architecture label as well as the project number, so as to acquire management content. The core component adds the acquired management content to the first data table. For the creation_time field of the first data table, the core component reads the mirror creation time by means of calling a log interface, and adds the mirror creation time to a table cell below the creation_time field of the first data table.

Referring to FIG. 3, fields in the second data table includes a serial number, label name (custom label), description (description of custom label), color, level, scope, project_id (project number), creation_time (mirror creation time), update_time (mirror update time), and deleted (has been deleted). In a specific implementation process, when the custom label is created, the core component calls data in the second data table, and compares the data with the custom label to determine whether the custom label has been existed in the second data table; on the condition that the custom label has been existed in the second data table, the core component reports, through the UI, that the label has been existed; and on the condition that the custom label has not been existed in the second data table, the core component adds the custom label to a table cell corresponding to the second data table after the user adds the custom label to the mirror. The core component calls the corresponding interface according to other fields of the second data table except the mirror name and the project number fields, so as to acquire the management content. For the update_time field of the second data table, the core component reads the mirror update time by means of calling a log interface, and adds the mirror update time to a table cell below the update_time field of the second data table.

Referring to FIG. 4, fields of the third data table includes a serial number, name (mirror name), project_id (project number), description (description of mirror), pull_count (mirror pull count), start count (mirror start count), creation_time (mirror creation time), and update_time (mirror update creation time). In a specific implementation process, the core component adds, to the third data table, a mirror name submitted to the registration component and the corresponding project number. After the adding succeeds, the core component calls a corresponding interface according to other fields of the third data table except the mirror name and the project number fields, so as to acquire management content; and the core component adds the acquired management content to the third data table. For the creation_time field of the third data table, the core component reads the mirror update time by means of calling a log interface, and adds the mirror update time to a table cell below the creation_time field of the third data table.

A query instruction in the query request is executed. The expansion core component joins the first data table, the second data table and the third data table according to the mirror query request to screen the mirror to be queried. In some embodiments, the join method includes:

```
select column_name(s)
from table 1
inner join table 2
ON table 1.column_name = table 2.column_name
```

Intersection of the table 1 (the first data table) and the table 2 (the second data table) are taken according to specific fields to generate a new table. If the mirror is retrieved according to the custom label, the first data table and the second data table may be merged through project_id, so that a data table of the mirrors with the custom labels. The number of fields of this data table is larger than the number of fields of the second data table. After retrieval according to the custom label through this data table, the registration component interface is called according to the contents of the fields in this data table to acquired detailed mirror information.

```
select column_name(s)
from table 1
left join table 2
ON table 1.column_name = table 2.column_name,
```

A complete set of table 1 will be generated; matching items in table 2 have values; and non-matching items are replaced by null, thus generating a new data table.

```
select column_name(s)
from table 1
right join table 2
ON table 1.column_name = table 2.column_name
```

A complete set of table 2 will be generated; matching items in table 1 have values; and non-matching items are replaced by null, thus generating a new table.

The new data table is obtained by join. The data table is screened according to a structured query language (SQL) query instruction in the mirror query request; the registration component interface is called according to the fields and records after the screening of the data table; and information of the mirror conforming to a screening result is returned.

The image list query method of the multi architecture cloud platform image warehouse provided by the present application retrieves the mirror data in the database component by configuring a new expansion core component. The expansion core component directly retrieves the mirror data in the database component, and creates relationships between the project number and the mirror name, the mirror version, the architecture label and the custom label; the first data table, the second data table and the third data table are joined to screen out the mirror to be queried, so as to solve the problem that the harbor itself cannot query mirrors across projects. Moreover, the expansion core component and the webhook cooperate to automatically acquire the architecture information of the mirror. The expansion component transmits the architecture information to the core component, and the core component extracts the keywords in the architecture information to generate the architecture label. The fixed architecture label is added to the mirror to facilitate the query of the mirror according to the architecture information.

Based on the same inventive concept, according to another aspect of the present disclosure, an embodiment of the present disclosure further provides an electronic device, including:
at least one processor; and
a memory, the memory stores a computer instruction executable on the at least one processor, and the computer instruction, when being executed by the at least one processor, implements operation of the steps of any one of the described image list query method of the multi architecture cloud platform image warehouse are executed.

Based on the same inventive concept, according to another aspect of the present disclosure, an embodiment of the present disclosure further provides a computer readable storage medium. The computer readable storage medium stores a computer program. When the computer program is executed by at least one processor, operations of the steps of any one of the described image list query method of the multi architecture cloud platform image warehouse are implemented.

Finally, it should be noted that a person of ordinary skill in the art would understand that all or some processes of the image list query methods in the described embodiments may be completed by computer-readable instructions instructing relevant hardware. The program may be stored in a computer readable storage medium, and when the program is executed, the processes of the embodiments of the method may be included.

Furthermore, it should be appreciated that a computer-readable storage medium (e. g., memory) herein may be a volatile memory or a non-volatile memory, or may include both a volatile memory and a non-volatile memory.

It should be noted that, in the claims, any reference signs placed between parentheses shall not be construed as limiting the claims. The term "include" does not exclude the presence of components or steps not listed in a claim. The term "a/an" or "one" in front of a component does not exclude the presence of a plurality of such components. The present disclosure may be implemented by means of hardware including several different components and by means of a suitably programmed computer. In the unit claims enumerating several apparatuses, several of these apparatuses may be specifically embodied by the same hardware. Use of words first, second and third does not denote any order. These words may be explained as names.

Although the preferred embodiments of the present disclosure have been described, those skilled in the art may make other changes and modifications to these embodiments once they acquire the basic creative concept. Therefore, attached claims is intended to be explained as including the preferred embodiments and all the changes and modifications that fall within the scope of the present disclosure.

Obviously, those skilled in the art may make various changes and modifications to the present disclosure without departing from the spirit and scope of the present disclosure. Therefore, if these changes and transformations of the present disclosure fall within the scope of the claims of the present disclosure and equivalent technologies of the present disclosure, the present disclosure is intended to include these changes and transformations.

What is claimed is:

1. A mirror list query method of a multi-architecture cloud platform mirror warehouse, deploying a harbor on kubernetes, deploying a queue component, a registration component, a core component, a database component and a work service component of the harbor in different pods, comprising:

adding two containers into the pod where a core component runs; configuring a request shunting component and an expansion core component respectively in the two containers, and specifying a target port in service (svc) of the pod of the core component as a port monitored by the request shunting component;

receiving, by the request shunting component, a request from the monitored port, determining, by the request shunting component, whether the request is a mirror query request, on the condition that the request is the mirror query request, transmitting, by the request shunting component, the request to the expansion core component, and on the condition that the request is not the mirror query request, transmitting, by the request shunting component, the request to the core component;

adding, by the core component, labels for mirrors; wherein configuring a webhook between the registration component and the expansion core component; when a mirror is added in the registration component, sending, by the webhook, a mirror name and a mirror version to the expansion core component, and calling, by the webhook, the expansion core component to acquire architecture information of the mirror, and making the expansion core component transmit the architecture information to the core component; and generating, by the core component, an architecture label according to the architecture information, and adding, by the core component, the architecture label to the mirror by means of executing a first instruction;

reading, by the expansion core component, mirror data in the database component, screening, by the expansion core component, the mirror data according to the mirror query request, wherein the expansion core component is joined with a first data table, a second data table and a third data table in the database component to acquire the mirror data, the first data table comprises at least one field combined by a mirror version and an architecture label, and a project number; the second data table comprises a custom label field and a project number; and the third data table comprises a mirror name field and a project number; calling, by the expansion core component, the registration component according to a screening result, and returning, by the expansion core component, information of a mirror conforming to the screening result.

2. The mirror list query method of the multi-architecture cloud platform mirror warehouse according to claim 1, wherein a parity bit is configured in a request packet; and different values are configured to the parity bit according to whether the request packet is a mirror query data packet.

3. The mirror list query method of the multi-architecture cloud platform mirror warehouse according to claim 2, wherein the request shunting component receives the request packet, reads the value of the parity bit, and determines whether the request is the mirror query request.

4. The mirror list query method of the multi-architecture cloud platform mirror warehouse according to claim 3, wherein adding, by the core component, the labels for the mirrors further comprises: creating a custom label by means of a user interface (UI); transmitting, by the UI, the custom label to the core component, or controlling, by the UI, the core component to acquire the custom label that has been defined; and executing, by the core component, a second instruction to add the custom label to the mirror.

5. The mirror list query method of the multi-architecture cloud platform mirror warehouse according to claim 2, wherein adding, by the core component, the labels for the mirrors further comprises: creating a custom label by means of a user interface (UI); transmitting, by the UI, the custom label to the core component, or controlling, by the UI, the core component to acquire the custom label that has been defined; and executing, by the core component, a second instruction to add the custom label to the mirror.

6. The mirror list query method of the multi-architecture cloud platform mirror warehouse according to claim 1, wherein adding, by the core component, the labels for the mirrors further comprises: creating a custom label by means of a user interface (UI); transmitting, by the UI, the custom label to the core component, or controlling, by the UI, the core component to acquire the custom label that has been defined; and executing, by the core component, a second instruction to add the custom label to the mirror.

7. The mirror list query method of the multi-architecture cloud platform mirror warehouse according to claim 6, wherein when the custom label is created, the core component calls data in the second data table, and compares the data with the custom label to determine whether the custom label has been existed in the second data table; on the condition that the custom label has been existed in the second data table, the core component reports, through the UI, that the label has been existed; and on the condition that the custom label has not been existed in the second data table, the core component adds the custom label to a table cell corresponding to the second data table after the custom label is added to the mirror.

8. The mirror list query method of the multi-architecture cloud platform mirror warehouse according to claim 6, wherein the core component adds, to the third data table, a mirror name submitted to the registration component and the project number corresponding to the mirror; after adding succeeds, the core component calls a corresponding interface according to other fields of the third data table except the mirror name and the project number, so as to acquire management content; and the core component adds the acquired management content to the third data table.

9. The mirror list query method of the multi-architecture cloud platform mirror warehouse according to claim 6, wherein the core component is configured to call a corresponding interface according to other fields of the second data table except the mirror name and the project number, so as to acquire management content.

10. The mirror list query method of the multi-architecture cloud platform mirror warehouse according to claim 6, the second instruction is a tag mirror name: custom label xxxx/project-test/mirror name: mirror version.

11. The mirror list query method of the multi-architecture cloud platform mirror warehouse according to claim 1, wherein the core component adds, to the first data table, a combination of the mirror version and the architecture label submitted to the registration component and the corresponding project number; after adding succeeds, the core component calls a corresponding interface according to other fields of the first data table except the mirror version and the architecture label as well as the project number, so as to acquire management content; and the core component adds the acquired management content to the third data table.

12. The mirror list query method of the multi-architecture cloud platform mirror warehouse according to claim 1, the first instruction is a tag mirror name: architecture label xxxx/project-test/mirror name: mirror version.

13. An electronic device, comprising:
at least one processor; and
a memory, storing a computer instruction executable on the at least one processor, wherein the computer instruction, when being executed by the at least one processor, cause the at least one processor to:
deploying a harbor on kubernetes, deploying a queue component, a registration component, a core component, a database component and a work service component of the harbor in different pods,
adding two containers into the pod where a core component runs; configuring a request shunting component and an expansion core component respectively in the two containers, and specifying a target port in service (svc) of the pod of the core component as a port monitored by the request shunting component;
receiving, by the request shunting component, a request from the monitored port, determining, by the request shunting component, whether the request is a mirror query request, on the condition that the request is the mirror query request, transmitting, by the request shunting component, the request to the expansion core component, and on the condition that the request is not the mirror query request, transmitting, by the request shunting component, the request to the core component;
adding, by the core component, labels for mirrors; wherein configuring a webhook between the registration component and the expansion core component; when a mirror is added in the registration component, sending, by the webhook, a mirror name and a mirror version to the expansion core component, and calling, by the webhook, the expansion core component to acquire architecture information of the mirror, and making the expansion core component transmit the architecture information to the core component; and generating, by the core component, an architecture label according to the architecture information, and adding, by the core component, the architecture label to the mirror by means of executing a first instruction;
reading, by the expansion core component, mirror data in the database component, screening, by the expansion core component, the mirror data according to the mirror query request, wherein the expansion core component is joined with a first data table, a second data table and a third data table in the database component to acquire the mirror data, the first data table comprises at least one field combined by a mirror version and an architecture label, and a project number; the second data table comprises a custom label field and a project number; and the third data table comprises a mirror name field and a project number; calling, by the expansion core component, the registration component according to a screening result, and returning, by the expansion core component, information of a mirror conforming to the screening result.

14. The electronic device according to claim 13, wherein a parity bit is configured in a request packet; and different values are configured to the parity bit according to whether the request packet is a mirror query data packet.

15. The electronic device according to claim 14, wherein the request shunting component receives the request packet, reads the value of the parity bit, and determines whether the request is the mirror query request.

16. The electronic device according to claim 13, wherein the computer instruction, when being executed by the at least one processor, cause the at least one processor further to:
adding, by the core component, the labels for the mirrors further comprises: creating a custom label by means of a user interface (UI); transmitting, by the UI, the custom label to the core component, or controlling, by the UI, the core component to acquire the custom label that has been defined; and executing, by the core component, a second instruction to add the custom label to the mirror.

17. The electronic device according to claim 16, wherein when the custom label is created, the core component calls data in the second data table, and compares the data with the custom label to determine whether the custom label has been existed in the second data table; on the condition that the custom label has been existed in the second data table, the core component reports, through the UI, that the label has been existed; and on the condition that the custom label has not been existed in the second data table, the core component adds the custom label to a table cell corresponding to the second data table after the custom label is added to the mirror.

18. The electronic device according to claim 16, wherein the core component adds, to the third data table, a mirror name submitted to the registration component and the project number corresponding to the mirror; after adding succeeds, the core component calls a corresponding interface according to other fields of the third data table except the mirror name and the project number, so as to acquire management content; and the core component adds the acquired management content to the third data table.

19. The electronic device according to claim 13, wherein the core component adds, to the first data table, a combination of the mirror version and the architecture label submitted to the registration component and the corresponding project number; after adding succeeds, the core component calls a corresponding interface according to other fields of the first data table except the mirror version and the architecture label as well as the project number, so as to acquire management content; and the core component adds the acquired management content to the third data table.

20. A non-transitory computer readable storage medium, storing a computer program, wherein when the computer program is executed by at least one processor, the computer program is configured to cause the at least one processor to:
deploying a harbor on kubernetes, deploying a queue component, a registration component, a core component, a database component and a work service component of the harbor in different pods,
adding two containers into the pod where a core component runs; configuring a request shunting component and an expansion core component respectively in the two containers, and specifying a target port in service (svc) of the pod of the core component as a port monitored by the request shunting component;
receiving, by the request shunting component, a request from the monitored port, determining, by the request shunting component, whether the request is a mirror query request, on the condition that the request is the mirror query request, transmitting, by the request shunting component, the request to the expansion core component, and on the condition that the request is not the mirror query request, transmitting, by the request shunting component, the request to the core component;
adding, by the core component, labels for mirrors; wherein configuring a webhook between the registration component and the expansion core component; when a mirror is added in the registration component, sending, by the webhook, a mirror name and a mirror version to the expansion core component, and calling, by the webhook, the expansion core component to acquire architecture information of the mirror, and making the expansion core component transmit the architecture information to the core component; and generating, by the core component, an architecture label according to the architecture information, and adding, by the core component, the architecture label to the mirror by means of executing a first instruction;
reading, by the expansion core component, mirror data in the database component, screening, by the expansion core component, the mirror data according to the mirror query request, wherein the expansion core component is joined with a first data table, a second data table and a third data table in the database component to acquire the mirror data, the first data table comprises at least one field combined by a mirror version and an architecture label, and a project number; the second data table comprises a custom label field and a project number; and the third data table comprises a mirror name field and a project number; calling, by the expansion core component, the registration component according to a screening result, and returning, by the expansion core component, information of a mirror conforming to the screening result.

\* \* \* \* \*